US012747369B2

(12) United States Patent
Chang et al.

(10) Patent No.: US 12,747,369 B2

(45) Date of Patent: Sep. 29, 2026

(54) HARD COATING COMPOSITION, HARD COATING FILM OBTAINED THEREFROM, LAMINATE INCLUDING HARD COATING FILM, METHOD OF FORMING HARD COATING FILM, AND ARTICLE INCLUDING HARD COATING FILM

(71) Applicant: Samsung Electronics Co., Ltd., Suwon-si (KR)

(72) Inventors: Wonsuk Chang, Hwaseong-si (KR); Ginam Kim, Seongnam-si (KR); Yongkwon Kim, Yongin-si (KR); Inki Kim, Hwaseong-si (KR); Hyunsu Shin, Hwaseong-si (KR); Seungsik Hwang, Seongnam-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 1 day.

(21) Appl. No.: 17/548,676

(22) Filed: Dec. 13, 2021

(65) Prior Publication Data

US 2022/0298375 A1 Sep. 22, 2022

(30) Foreign Application Priority Data

Mar. 17, 2021 (KR) ........................ 10-2021-0034868

(51) Int. Cl.
*C09D 151/08* (2006.01)

(52) U.S. Cl.
CPC .................................. *C09D 151/08* (2013.01)

(58) Field of Classification Search
CPC ................ C08F 220/20; C08F 222/102; C08F 222/103; C09D 151/08
See application file for complete search history.

(56) References Cited

U.S. PATENT DOCUMENTS 8,617,711 B2 12/2013 Okazaki et al.
2006/0134400 A1* 6/2006 Takada ................ C08G 18/757 427/372.2
2006/0251848 A1 11/2006 Armstrong et al.
2010/0143674 A1 6/2010 Yoshihara et al.
(Continued)

FOREIGN PATENT DOCUMENTS

CN 102241939 A 11/2011
CN 108504146 A 9/2018
(Continued)

OTHER PUBLICATIONS

Machine translation of JP-2015120254-A, retrieved Apr. 8, 2023. (Year: 2015).*
(Continued)

*Primary Examiner* — Callie E Shosho
*Assistant Examiner* — Krupa Shukla
(74) *Attorney, Agent, or Firm* — CANTOR COLBURN LLP

(57) ABSTRACT

A hard coating film comprising a cured (meth)acrylate-based resin having a water contact angle of 40° or less and a pencil hardness of 6H or greater at a 1 kilogram load, a hard coating composition used for the formation of the hard coating film,
(Continued)

a method of forming the hard coating film, a laminate including the hard coating film, and an article including the laminate.

11 Claims, 3 Drawing Sheets

(56) References Cited

U.S. PATENT DOCUMENTS

| | | | | |
|---|---|---|---|---|
| 2012/0321857 | A1* | 12/2012 | Schmidt | B29C 45/1679 425/129.1 |
| 2015/0197662 | A1* | 7/2015 | Kang | C09D 143/04 428/209 |
| 2016/0194778 | A1* | 7/2016 | Shakagoori | C25D 11/16 205/206 |
| 2017/0276840 | A1* | 9/2017 | Horio | B32B 3/30 |
| 2019/0119506 | A1 | 4/2019 | Kim | |

FOREIGN PATENT DOCUMENTS

| | | | | |
|---|---|---|---|---|
| JP | 1999-021512 | A | | 1/1999 |
| JP | 2009026387 | A | * | 2/2009 |
| JP | 2012107225 | A | | 6/2012 |
| JP | 5170922 | B2 | | 1/2013 |
| JP | 2015120254 | A | * | 7/2015 |
| JP | 6416680 | B2 | | 10/2018 |
| KR | 100759101 | B1 | | 9/2007 |
| KR | 20150056455 | A | | 5/2015 |
| KR | 101532545 | B1 | | 6/2015 |
| KR | 20160011026 | A | | 1/2016 |
| KR | 20190044249 | A | | 4/2019 |

OTHER PUBLICATIONS

Machine translation of JP-2009026387-A, retrieved Feb. 8, 2025. (Year: 2009).*

PCT International Search Report for Patent Application No. PCT/KR2022/003762 dated Jun. 22, 2022.

PCT Written Opinion PCT No. PCT/KR2022/003762 dated Jun. 22, 2022.

Aquamica (Tm) Hydrophilic Super Hard Coating—Clariant (Japan) K. K. Polysilazane Business group Tokyo.

Artience, UV-curable functional hard coating gent Lioduras (TM)—Toyochem Co., Ltd.

Cquamica Antigraffit—Corrosion.

Optical Equipment Reflecting Shielding Material, Nakai Industrial Co., Ltd, Mitsubishi Group.

Shunsuke Nishimoto et al., "Bioinspired self-cleaning surfaces with superhydrophobicity, superoleophobicity, and superhydrophilicity", RSC Advances, 2013, 3, 671.

Extended European Search Report issued on Jan. 8, 2025, in corresponding EP Patent Application No. 22771789.9, 7 pp.

Office Action mailed Jul. 16, 2025, in corresponding CN Patent Application No. 202280021766.0, with English Translation, 27 pages combined.

Office Action issued Oct. 16, 2025, in corresponding KR Patent Application No. 10-2021-0034868 with English Translation, 9 pages total combined.

* cited by examiner

HARD COATING COMPOSITION, HARD COATING FILM OBTAINED THEREFROM, LAMINATE INCLUDING HARD COATING FILM, METHOD OF FORMING HARD COATING FILM, AND ARTICLE INCLUDING HARD COATING FILM

CROSS-REFERENCE TO RELATED APPLICATION

This application claims priority under 35 U.S.C. § 119 to Korean Patent Application No. 10-2021-0034868, filed on Mar. 17, 2021, in the Korean Intellectual Property Office, the disclosure of which is incorporated by reference herein in its entirety.

BACKGROUND

1. Field

The present disclosure relates to a hard coating composition and a hard coating film obtained from the composition, a laminate including the hard coating film, a method of forming the hard coating film, and an article including the hard coating film.

2. Description of the Related Art

A substrate that is used daily such as glass or plastic substrate will be exposed to external contaminates, and often water and/or aqueous detergents are used to clean the substrate surface. Recently, the availability of water resources is decreasing due to environmental pollution and climate change, and in response to such water shortages, studies are ongoing to address this water shortage such as desalination and water recycling. However, there remains limitations to resolving the global water shortage.

SUMMARY

The present disclosure provides a hard coating composition for forming a hard coating film on a surface of a substrate so that a contaminated surface of the substrate can be cleaned using relatively smaller amounts of wash water in comparison to existing substrates with prior art coatings. The disclosure also provides a hard coating film obtained from the hard coating composition, and a method of forming the hard coating film.

Additional aspects will be set forth in part in the description, which follows and, in part, will be apparent from the description, or may be learned by practice of the presented embodiments of the disclosure.

According to an aspect, provided is a hard coating composition including a multifunctional monomer, and a monofunctional monomer including a monofunctional monomer with a hydrophilic group (also referred to as 'hydrophilic monofunctional monomer'), wherein an amount by weight of the multifunctional monomer is greater than the amount by weight of the monofunctional monomer with a hydrophilic group. The amount of the monofunctional monomer with a hydrophilic group may be about 29 weight percent (wt %) to about 45 wt % based upon the total weight of the composition.

According to another aspect, provided is a (meth)acrylate-based resin, wherein the hard coating film has a water contact angle of 40° or less, and a pencil hardness of 6H or greater at a 1 kilogram (kg) load, wherein the film is free of metals.

According to another aspect, provided is an article including a substrate, and the hard coating film disposed on the substrate.

According to another aspect, provided is a method of forming a hard coating film, the method including spray-coating a hard coating composition on a substrate, and irradiating the spray-coated substrate with ultraviolet (UV) light to form a hard coating film on the substrate.

BRIEF DESCRIPTION OF THE DRAWINGS

The above and other aspects, features, and advantages of certain embodiments of the disclosure will be more apparent from the following description taken in conjunction with the accompanying drawings, in which.

DESCRIPTION OF THE INVENTION

Figure 1:
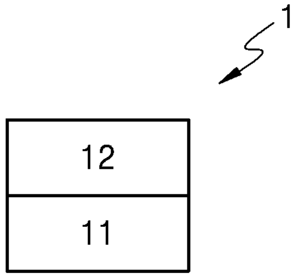
FIG. 1 is a schematic diagram of a hard coating film according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Rather, these embodiments are provided so that the present disclosure can be made thorough and complete, and will sufficiently convey the scope of the present creative idea to those of ordinary skill in the art. Like reference numerals refer to like elements.

It will be understood that when an element is referred to as being "on" another element, the element can be directly on another element or intervening elements. In contrast, when an element is referred to as being "directly on" another element, there are no intervening elements present.

The terminology used herein are for the purpose of describing specific implementations only and are not intended to limit the creative thought. The singular forms used herein include plural forms, including "at least one," unless clearly specified otherwise. The expression "at least one" should not be construed as limiting a singular form. As used herein, the term "and/or" includes any and all combinations of one or more of the associated listed items. It will be further understood that the terms "comprises" and/or "comprising," when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±10% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or excessively formal sense unless expressly so defined herein.

Example embodiments are described herein with reference to cross-sectional views, which are schematic illustrations of idealized embodiments. As such, variations from the shapes of the illustrations as a result, for example, of manufacturing techniques and/or tolerances, are to be expected. Thus, embodiments described herein should not be construed as limited to particular shapes of regions as illustrated herein but are to include, for example, deviations in shapes that result from manufacturing. For example, a region illustrated or described as flat may, typically, have rough and/or nonlinear features. Furthermore, an angle illustrated sharp may be rounded. Thus, the regions illustrated in the figures are schematic in nature and their shapes are not intended to illustrate the precise shape of a region and are not intended to limit the scope of the present claims.

While specific embodiments have been described, alternatives, modifications, variations, improvements, and substantial equivalents that are currently unexpected or unforeseeable may be made by the applicant or persons skilled in the art. Thus, the appended claims that can be filed and modified are intended to include all such alternatives, modifications, variations, improvements, and substantial equivalents.

Hereinafter, one or more example embodiments of a hard coating composition, a hard coating film, a method of forming the hard coating film, and an article including the hard coating film according to the present disclosure will be described in detail.

Hard Coating Composition

According to an aspect, a hard coating composition includes: a multifunctional monomer; and a monofunctional monomer including a monofunctional monomer with a hydrophilic group, wherein an amount by weight of the multifunctional monomer is greater than the amount by weight of the monofunctional monomer with a hydrophilic group, and an amount of the monofunctional monomer with a hydrophilic group may be about 29 weight percent (wt %) to about 45 wt % based upon the total weight of the composition, and the hard coating composition is free of metals.

According to an embodiment, the monofunctional monomer includes a monofunctional monomer with a hydrophilic group and/or a monofunctional monomer without a hydrophilic group. For example, the monofunctional monomer includes a monofunctional monomer with a hydrophilic group and a monofunctional monomer without a hydrophilic group.

The term "free of metals" means that the hard coating composition or the hard coating film that is derived from that composition includes less than 5000 parts per million, (ppm), of total metal as determined by Inductively Coupled plasma Atomic Emission Spectroscopy (ICP-AES). The metals that are essentially absent from the coating composition or the resulting film include the metals of Group IA metals, Group IIA metals, the transition metals, an the Group IIIA metals, IVA, VA, and VIA metals. However, as is well understood by those of ordinary skill, it can be difficult to completely remove all metals from chemical compositions because of the processes involved in the sourcing or manufacture of chemical raw materials.

According to an embodiment, the term hard coating composition or the hard coating film that is derived from that composition may include less than 2000 ppm of total metal, and in many instances, less than 1000 ppm, or even less than 500 ppm, of total metal. In an embodiment, the amount of total metal is not detectable by ICP-AES.

According to an embodiment, a weight ratio of the multifunctional monomer to the monofunctional monomer with a hydrophilic group may be about 1:1 to about 1.5:1.

The hard coating composition may simultaneously include the multifunctional monomer and the monofunctional monomer, and because the weight ratio of the multifunctional monomer to the monofunctional monomer is about 1:1 to about 1.5:1, the hard coating composition after being cured, has a high hardness, which may be achieved through the crosslinking provided by the multifunctional monomer. Moreover, and because of the inclusion of the monofunctional monomer with a hydrophilic group in the coating, the monofunctional monomer with a hydrophilic group may crosslink at one end of the multifunctional monomer and may be externally exposed such that the hard coating film has greater hydrophilic character at or near the surface of the film.

According to an embodiment, the multifunctional monomer and the monofunctional monomer without a hydrophilic group may be an acrylic monomer or the corresponding methacrylic monomer. For example, the multifunctional monomer may be a multifunctional acrylate monomer or a multifunctional methacrylate monomer. For example, the monofunctional monomer without a hydrophilic group may be a monofunctional acrylate or a monofunctional methacrylate. Hereinafter, as is recognized and understood by a person of ordinary skill in the art, the term "(meth)acrylate" refers to either an acrylate form or the corresponding methacrylate form of a stated monomer.

The acrylate group or methacrylate group of the multifunctional monomer may function as crosslinking group during curing to form a polymer film having a three-dimensional network structure.

In one embodiment, the multifunctional monomer may be a hexa(meth)acrylate monomer, penta(meth)acrylate monomer, a tetra(meth)acrylate monomer, tri(meth)acrylate monomer, or a di(meth)acrylate monomer. For example, the multifunctional monomer may include a mixture of at least two kinds of monomer from among hexa(meth)acrylate monomers, penta(meth)acrylate monomers, tetra(meth) acrylate monomers, tri(meth)acrylate monomers, and di(meth)acrylate monomers.

In one embodiment, the multifunctional monomer may include a mixture of a tetra(meth)acrylate monomer, a tri(meth)acrylate monomer, and a di(meth)acrylate monomer.

In one embodiment, the multifunctional monomer may be pentaerythritol tetra(meth)acrylate, pentaerythritol tri(meth) acrylate, pentaerythritol di(meth)acrylate, dipentaerythritol di(meth)acrylate, dipentaerythritol tri(meth)acrylate, dipentaerythritol tetra(meth)acrylate, dipentaerythritol penta(meth)acrylate, dipentaerythritol hexa(meth)acrylate, ethoxylated trimethylolpropane di(meth)acrylate, ethoxylated trimethylol propane tri(meth)acrylate, ethoxylated ditrimethylolpropane di(meth)acrylate, ethoxylated ditrimethylolpropane tri(meth)acrylate, ethoxylated ditrimethylolpropane tetra(meth)acrylate, ethoxylated ditrimethylolpropane penta (meth)acrylate, ethoxylated ditrimethylolpropane hexa(m-eth)acrylate, glycerol tri(meth)acrylate, glycerol di(meth) acrylate, propoxylated glycerol di(meth)acrylate, propoxylated glycerol tri(meth)acrylate, ethylene glycol di(meth)acrylate, propylene glycol di(meth)acrylate, 1,3-butanediol di(meth)acrylate, 1,4-butanediol di(meth)acrylate, neopentyl glycol di(meth)acrylate, diethylene glycol di(meth)acrylate, triethylene glycol di(meth)acrylate, dipropylene glycol di(meth)acrylate, ethoxylated bisphenol A di(meth)acrylate, ethoxylated bisphenol F di(meth)acrylate, or a combination of (meth)acrylates thereof.

For example, the multifunctional monomer may include pentaerythritol tetra(meth)acrylate, pentaerythritol tri(meth) acrylate, ethoxylated trimethylol propane tri(meth)acrylate, or ethoxylated bisphenol A di(meth)acrylate or a combination of (meth)acrylates thereof.

In one embodiment, a weight ratio of the tetra(meth) acrylate monomer, the tri(meth)acrylate monomer, and the di(meth)acrylate monomer may be 0.1 to 2:2 to 5:1, respectively. For example, the weight ratio of the tetra(meth) acrylate monomer, the tri(meth)acrylate monomer, and the di(meth)acrylate monomer may be 0.2 to 1.8:2.8 to 4.8:1.

By the inclusion of the (meth)acrylate monomers having various numbers of functional groups, strong crosslink bonds may be formed in the cured film, and thus a hard coating film obtained through curing of the hard coating composition according to the embodiments described may have improved robustness.

In one embodiment, hard coating composition may include a monofunctional monomer with a hydrophilic group and a monofunctional monomer without a hydrophilic group.

In one embodiment, a weight ratio of monofunctional monomer with a hydrophilic groups among the monofunctional monomers may be larger than the amount of to monofunctional monomer without a hydrophilic group.

For example, the weight ratio of the monofunctional monomer with a hydrophilic group and the monofunctional monomer without a hydrophilic group may be 1.5:1~15:1.

Because the monofunctional monomer includes the monofunctional monomer with a hydrophilic group and monofunctional monomer without a hydrophilic group, a hard coating film that is both durable and with some hydrophilic character at the surface may be obtained.

In one embodiment, the monofunctional monomer with the hydrophilic group may include a hydrophilic group, for example, an ether group, an alcohol group, an alkoxy group, a hydroxyl group, an amino group, a polyether group, or a combination thereof. However, embodiments are not limited thereto, and may include other groups recognized by those of ordinary skill that can impart some degree of hydrophilic character to a surface of the hard coating.

In one embodiment, monofunctional monomer with a hydrophilic group may include an alkoxy group-containing (meth)acrylate and a hydroxyl group-containing (meth)acrylate.

For example, the alkoxy group-containing (meth)acrylate may include methoxy polyethylene glycol (meth)acrylate, methoxy polypropylene glycol (meth)acrylate, ethoxy polyethylene glycol, ethoxy polypropylene glycol, or a combination of (meth)acrylates thereof. The "polyethylene glycol" of the methoxy polyethylene glycol (meth)acrylate may have a molecular weight of about 200 grams per mole (g/mol) or greater. For example, the "polyethylene glycol" may have a molecular weight of about 400 g/mol or about 600 g/mol. The methoxy polyethylene glycol (meth)acrylate refers to any methoxy polyethylene glycol (meth)acrylate including a polyethylene glycol having a molecular weight of about 200 g/mol, about 400 g/mol, or about 600 g/mol.

For example, the hydroxyl group-containing (meth)acrylate may include hydroxyethyl (meth)acrylate, hydroxypropyl (meth)acrylate, hydroxybutyl (meth)acrylate, or a combination of (meth)acrylates thereof.

In one embodiment, the monofunctional monomer without the hydrophilic group may be a glycidyl group-containing (meth)acrylate or a glycidyl group-containing (meth) acrylate.

In one embodiment, the hard coating composition may further include an initiator.

In one embodiment, the initiator may be an UV-absorbing photoinitiator that absorbs light of a wavelength of 400 nanometers (nm) or less. This photoinitiator may be a benzoin ether-based compound, an acetophenone-based compound, an α-ketone-based compound, an oxime-based compound, a benzoin-based compound, a benzyl-based compound, a benzophenone-based compound, a ketal-based compound, a thioxanthone-based compound, an acylphosphine oxide-based compound, or the like.

For example, the initiator may be benzoin methyl ether, benzoin ethyl ether, benzoin propyl ether, benzoin isopropyl ether, benzoin isobutyl ether, 2,2-dimethoxy-1,2-diphenylethan-1-one, anisol methyl ether, 2,2-diethoxyacetophenone, 2,2-dimethoxy-2-phenylacetophenone, 1-hydroxycyclohexylphenylketone, 4-phenoxydichloroacetophenone, 4-t-butyldichloroacetophenone, 2-methyl-2-hydroxypropiophenone, 1-[4-(2-hydroxyethyl)phenyl]-2-hydroxy-2-methylpropane-1-one, 1-phenyl-1,1-propanedione-2-(o-ethoxycarbonyl)-oxime, benzoin, benzyl, benzophenone, benzoylbenzoic acid, 3,3'-dimethyl-4-methoxybenzophenone, polyvinylbenzophenone, α-hydroxycyclohexylphenylketone, benzyldimethylketal, thioxanthone, 2-chlorothioxanthone, 2-methylthioxanthone, 2,4-dimethylthioxanthone, isopropylthioxanthone, 2,4-dichlorothioxanthone, 2,4-diethylthioxanthone, 2,4-diisopropylthioxanthone, dodecylthioxanthone, 2,4,6-trimethylbenzoyl-diphenyl-phosphine oxide, bis(2,4,6-trimethylbenzoyl)-phenylphosphine oxide, or a combination thereof.

The initiator, e.g., a photoinitiator, may be present in the hard coating composition from about 0.5 parts to about 3 parts by weight with respect to 100 parts by weight of the total composition.

In one embodiment, the hard coating composition may be a non-solvent type composition that does not substantially include a solvent. Thus, it may be easy to form a dense hard coating film without formation of pores in the film caused by volatilization of the solvent.

In one embodiment, hard coating composition may not include more than 20 wt %, or more than 10 wt %, or more than 5 wt %, or more than 1 wt %, of solvent, each based on the total weight of the composition.

In one embodiment, the hard coating composition may further include various additives, such as a dispersant, a thickening agent, a leveling agent, a curing accelerator, or the like, within a range that does not inhibit physical properties of the hard coating film, in order to increase coating ability, workability, robustness, hydrophilicity, uniformity, or rate of curing.

Hard Coating Film

According to an aspect, a hard coating film may include a (meth)acrylate-based resin and have a water contact angle of 40° or less and a pencil hardness of 6H or greater at 1 kg load, and the film is free of metals.

In one embodiment, the hard coating film may be derived from a (meth)acrylate-based monomer.

In one embodiment, the (meth)acrylate-based resin may be derived from one or more multifunctional monomers and one or more monofunctional monomers with a hydrophilic group.

In the prior art, to obtain a hard coating film having a surface with hydrophilic character, (for example, having a water contact angle of 40° or less), hydrolysis was performed after mixing the monomer resins with an inorganic material such as silane, an alkali metal salt, or the like, or an anionic hydrophilic group was introduced in the form of a metal acid salt into a polymer to cure the hard coating film to provide a hydrophilic hard coating film. However, due to the high surface energy of the hydrophilic group in such hard coatings, the hydrophilic group has a tendency to orient itself away from the surface, and instead, tends to orient toward the interior of the coating during the curing process. Moreover, a hydrophobic group with low surface energy such as an alkyl group would tend to orient itself in the direction of the surface. For this reason, the introduction of relatively large amounts of inorganic material such as a metal acid salt was necessary to direct a monomer with hydrophilic group to the surface of a cured coating. However, the excessive amounts of inorganic material (e.g., inorganic salts lowers the robustness of a cured hard coating film, and if a polyethylene glycol (PEG), which is an oligomeric hydrophilic group, is used as the hydrophilic group, there is a problem in which the robustness of the hard coating film is seriously compromised due to the softness of the PEG.

The hydrophilic character and the robustness of the coating film surface have a trade-off relationship, and in this field, it was a very difficult task to simultaneously improve the hydrophilic character and the robustness of the hard coating film.

To address this technical problem, the present inventors have confirmed that, in the absence of any added inorganic material, when a coating composition using a (meth)acrylate-based resin is derived from one or more multifunctional monomers and one or more monofunctional monomers with a hydrophilic group, a cured hard coating film could be obtained with a water contact angle of 40° or less, and a pencil hardness of 6H or greater at 1 kilogram (kg) load.

When a hydrophobic substrate is not used in conjunction with the hard coating film according to embodiments of the present disclosure, and that substrate is contaminated with a hydrophobic contaminant that needs to be removed by cleaning with water or a water-based solution, it is difficult for the water to penetrate to an interface between the hydrophobic substrate and the hydrophobic contaminant, thus making it difficult to remove the hydrophobic contaminant from the substrate.

However, the hard coating film obtained according to an embodiment of the present disclosure has some degree of hydrophilic character, and thus, when a surface of the hard coating film becomes contaminated with a hydrophobic contaminant, and then water or a water solution is used to clean the surface, the water will penetrate to the interface between the hard coating film and the contaminant and separate the contaminant from the surface of the hard coating film. As a result, the hydrophobic contaminant may be more easily removed from the hard coating film with relatively smaller amounts of water or water solution.

Although it will be described later, a hard coating film according to the present disclosure is formed by spray-coating the hard coating composition and curing with UV light.

In one embodiment, before a first portion of a hard coating composition is completely cured, the UV irradiation is halted or stopped, and a second portion of the hard coating composition is spray-coated onto the coated substrate. The first and second coatings are than completely cured with UV light, and thus a hard coating film having excellent hydrophilic character and high hardness may be obtained.

In one embodiment, the weight ratio of the multifunctional monomer to the monofunctional monomer with the hydrophilic group may be greater than 1:1 to about 1.5:1.

When the weight ratio of the multifunctional monomer to the hydrophilic monofunctional monomer with the hydrophilic group is satisfied, a hard coating film with robustness and hydrophilicity may be obtained.

In one embodiment, the monomeric unit derived from the monofunctional monomer with the hydrophilic group may be about 29 wt % to about 45 wt % based on the total weight of the acrylate-based resin.

When the amount of the monomeric unit originating from the monofunctional monomer with the hydrophilic group is satisfied, a hard coating film having a water contact angle of 40° or less may be obtained. When the amount of the monomeric unit derived from the monofunctional monomer with the hydrophilic group exceeds the above weight ratio or the about 45 wt %, the robustness of the hard coating film may decrease. When the amount of the monomeric unit derived from the monofunctional monomer with the hydrophilic group is less than about 29 wt %, the hard coating film may not have sufficient hydrophilic character.

In one embodiment, the hard coating film may have a thickness of about 100 micrometers (μm) to about 250 μm. When this thickness range is satisfied, a substrate may be sufficiently protected from contaminants.

The (meth)acrylate-based resin may be formed from the above-described hard coating composition. For contents related to the hard coating composition, the above description may be referred to.

Laminate

A laminate according to an aspect will be described with reference to FIGS. 1 to 3.

Referring to FIG. 1, a laminate according to an aspect may include: a substrate 11; and a hard coating film 12 as described above disposed on the substrate 11. Here, the hard coating film 12 may be formed by curing the above-described hard coating composition.

The hard coating film may be disposed on the substrate and protect the substrate from an external contaminant, and also may have a water contact angle of 40° or less to allow the contaminant to be easily washed from the surface, e.g. with water or a water solution, and may have a pencil hardness of 6H or greater at 1 kg load.

In one embodiment, the substrate may include: a metal plate, including iron, aluminum, copper, or an alloy thereof; a resin molding product of polyethylene, polypropylene, ethylene-vinyl acetate copolymer, polyimide, polyacrylate, polyester, vinyl chloride resin, vinylidene chloride resin, polycarbonate, polyurethane, or an acrylonitrile-butadiene-styrene copolymer; ceramics such as glass; or a plastic.

For example, the substrate may be a ceramic or a plastic.

Figure 2:
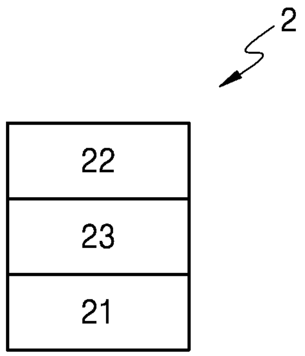
FIG. 2 is a schematic diagram of a hard coating film according to another embodiment.

Referring to FIG. 2, a laminate according to an aspect may include: a substrate 21; a hard coating film 22 disposed on the substrate 21; and a primer layer 23 disposed between the substrate 21 and the hard coating film 22.

For contents related to the substrate 21 and the hard coating film 22, the above descriptions of the substrate and the hard coating film may be referred to.

A coating material for forming the primer layer 23 may be a coating composition including, as a major component, polyester-based resin, polyamide-based resin, polyurethane-based resin, epoxy resin, phenolic resin, (meth)acrylic resin, polyvinyl acetate-based resin, polyolefin-based resin, or a copolymer or modified resin thereof, or a cellulose-based resin.

In another embodiment, by increasing the surface energy of the substrate with a corona treatment, flame treatment, or plasma treatment, the adhesion between the hard coating film and the substrate may be increased without the primer layer.

In one embodiment, the primer layer 23 may have a thickness of about 2 μm to about 50 μm.

In one embodiment, the laminate may further include a buffer layer (not shown) interposed between the substrate 21 and the hard coating film 22. The buffer layer may withstand stress generated according to a difference in surface energy between the substrate and the hard coating film, and thus minimize or prevent separation of the hard coating film from the substrate.

For example, when the laminate includes a buffer layer, the buffer layer may be arranged between the substrate 21 and the primer layer 23, between the hard coating film 22 and the primer layer 23, or both between the substrate 21 and the primer layer 23 and between the hard coating film 22 and the primer layer 23.

In one embodiment, at least one functional layer (not shown) may further be included on the hard coating film. The functional layer may be arranged on the surface of the hard coating film to improve durability of the hard coating film.

Figure 3:
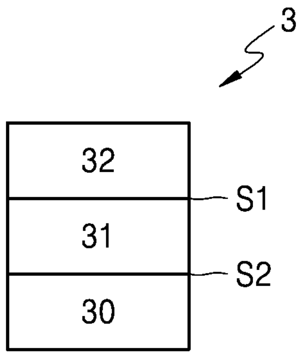
FIG. 3 is a schematic diagram of a hard coating film according to still another embodiment.

Referring to FIG. 3, a laminate according to an aspect may include: a substrate (31); a hard coating film 32 disposed on a surface S1 of the substrate 31; and an adhesive layer 30 disposed on an opposite surface S2 of the substrate 31.

Moreover, if the laminate further includes adhesive layer on the opposite surface of the substrate, the laminate may be more easily applied to the surface of an article that is likely to be contaminated by an external contaminant. In addition, by applying the laminate onto the surface of an article, the surface of the article may be protected from an external material, and the article may have improved durability as the surface of the article may be easily washed.

Although not illustrated in FIG. 3, a primer layer (not shown) may be further disposed on the substrate 31 and the hard coating film 32 disposed on one surface (S1) of the substrate 31. The above description of the primer layer with respect to FIG. 2 may be referred to.

Article

According to an aspect, an article includes the laminate.

For example, the laminate is provided on the outside of the article not only to protect the outside of the article from an external contaminant, but also to allow the surface of the article to be easily washed with water if it becomes contaminated, and thus helps improve the durability of the article.

In one embodiment, the article may include, but not limited to, glass, a mirror, a display article such as a cell-phone display, a guide board such as a signboard or advertising sign, an electronic device case, an exterior material such as a vehicular exterior material, or toilet articles such as a toilet or washstand. Any articles exposed situations where the surface can be contaminated from the outside may be included.

Method of Forming Hard Coating Film

A method of forming a hard coating film according to an aspect may include spray-coating the hard coating composition according to embodiments on a substrate, and irradiating the applied composition with UV light to form a hard coating film on the substrate.

In one embodiment, the method may further include forming a primer layer on the substrate before applying the hard coating composition to the substrate.

For example, the method may include coating a primer coating composition on the substrate to form a primer coating layer before the application of the hard coating composition.

The primer coating composition may be a resin composition as described above.

In another embodiment, the substrate may be surface-modified before the application of hard coating composition. As described, the surface modification of the substrate may be performed by corona treatment, flame treatment, plasma treatment, or a combination thereof.

In one embodiment, the hard coating film may be formed by spray-drying the hard coating composition in two or more portions, e.g., at least two or three times, followed by a final UV curing.

For example, the hard coating film may be formed by spraying a first portion of the hard coating composition, and then irradiating with UV light. In this case, the UV irradiation is halted or stopped before the first portion of the sprayed hard coating composition is completely cured. A second portion of the hard coating composition is then sprayed onto the incompletely cured first potion hard coating film, and then the collective coatings are irradiated with UV light to form a completely cured hard coating film.

As noted above, the hard coating composition may be spray-coated two times. However, embodiments are not limited thereto, and the number of times that spray-coating is performed may be appropriately selected by a person skilled in the art in consideration of thickness and desired physical properties of the hard coating. In addition, providing a primer layer with the completely cured hard coating film and forming an additional hard coating film may be performed.

For example, the hard coating composition may be sprayed twice in a 1:1 ratio. However, embodiments are not limited thereto, and the hard coating composition may be sprayed n times in multiple and varied portions.

The hard coating film formed by the continuous spray-laminate process in which the hydrophilic groups are directed more to an external side of the coating film and strong crosslink bonds are formed in the coating film. The formed hard coating film may have a water contact angle of 40° or less, and a pencil hardness of 6H or greater at 1 kg load, and the hard coating is free of metals.

In one embodiment, when the substrate is a film, the method may further include providing an adhesive layer on a surface of the substrate opposite the surface where the hard coating film is formed. In addition, the method may further include providing a release film on the surface of the adhesive layer.

Thereby, a hard coating adhesive film that is applicable to an article of which the outer surface needs to be protected may be formed. The adhesive layer may use various known adhesives, such as an acrylic adhesive, an epoxy-based adhesive, a novolak-based adhesive, or the like.

In one embodiment, the method may further include, after the forming of the hard coating film, providing a functional layer on the hard coating film.

The functional layer may increase the robustness of the hard coating film, and may include silica, inorganic metal, or the like. The functional layer is distinct from the hard coating layer described herein In one embodiment, the method of preparing the hard coating film uses the hard coating composition that includes little or no solvent, and thus a need for a drying step may be minimize or omitted entirely. This would reduce the processing time, and therefore reduce costs of manufacture. For example, when no solvent is used or present in the hard coating composition, a hard coating film having high uniformity may be formed.

Hereinafter, embodiments of a hard coating composition, a hard coating film formed therefrom, and a laminate including the hard coating film according to the present invention will be described in detail with reference to the following examples. In the following examples and comparative examples, the expression that "B was used instead of A" means that the molar equivalent of A is the same as the molar equivalent of B.

EXAMPLES

Preparation of Hard Coating Composition

Preparation Examples 1 to 15

Monomer components as shown in Table 1 are mixed to prepare hard coating compositions.

Evaluation Example 1

The amount of multifunctional monomers, the amount of monofunctional monomers, the weight ratio of multifunctional monomer:monofunctional monomer, the amount of hydrophilic monomers, and the weight ratio of hydrophilic monomers in each of the hard coating compositions prepared in Preparation Examples 1 to 15 were calculated and presented in Tables 1A and 1B.

TABLE 1A

| | Material | Composition(g) Prep. Ex. 1 | Prep. Ex. 2 | Prep. Ex. 3 | Prep. Ex. 4 | Prep. Ex. 5 | Prep. Ex. 6 | Prep. Ex. 7 |
|---|---|---|---|---|---|---|---|---|
| Multifunctional monomer | Pentaerythritol tetraacrylate | 2 | 12 | 12 | 12 | 10 | 3 | 7 |
| | Pentaerythritol tri acrylate | 15 | 5 | 5 | 12 | 12 | 15 | 5 |
| | Ethoxylated (EO15) trimethylolpropane tri acrylate | 7 | 7 | 25 | 20 | 20 | 7 | 7 |
| | Ethoxylated (EO10) bisphenol A diacrylate | 7 | 7 | 7 | 7 | 7 | 10 | 10 |
| Monofunctional monomer | Methoxy polyethylene glycol (PEG600) methacrylate | 15 | 10 | 10 | 12 | 18 | 5 | 10 |
| | 2-hydroxyethyl acrylate | 2.5 | 15 | 25 | 20 | 24 | 10 | 20 |
| | Glycidyl methacrylate | 10 | 3 | 3 | 3 | 3 | 10 | 5 |
| | Total | 58.5 | 59 | 87 | 86 | 94 | 60 | 64 |
| Initiator | Darocur 1173 (2-hydroxy-2-methylpropiophenone) | 2.5 | 2.5 | 2.5 | 2.5 | 2.5 | 2.5 | 2.5 |
| Amount of multifunctional monomer | | 31 | 31 | 49 | 51 | 49 | 35 | 29 |
| Amount of monofunctional monomer | | 27.5 | 28 | 38 | 35 | 45 | 25 | 35 |
| Amount ratio of multifunctional/monofunctional monomer | | 1.13 | 1.11 | 1.29 | 1.46 | 1.09 | 1.40 | 0.83 |
| Amount of hydrophilic monofunctional monomer | | 17.5 | 25.0 | 35.0 | 32.0 | 42.0 | 15.0 | 30.0 |
| Amount ratio of hydrophilic monomer (%) | | 29.9 | 42.4 | 40.2 | 37.2 | 44.7 | 25.0 | 46.9 |

TABLE 1B

| | Material | Prep Ex. 8 | Prep Ex. 9 | Prep Ex. 10 | Prep Ex. 11 | Prep Ex. 12 | Prep Ex. 13 | Prep Ex. 14 | Prep Ex. 15 |
|---|---|---|---|---|---|---|---|---|---|
| | | Composition(g) | | | | | | | |
| Multifunctional monomer | Pentaerythritol tetraacrylate | 12 | 20 | 25 | 10 | 10 | 10 | 10 | 10 |
| | Pentaerythritol triacrylate | 15 | 20 | 20 | 12 | 12 | 12 | 12 | 10 |
| | Ethoxylated (EO15) trimethylolpropane triacrylate | 10 | 20 | 20 | 10 | 15 | 10 | 10 | 10 |
| | Ethoxylated (EO10) bisphenol A diacrylate | 7 | 7 | 15 | 7 | 7 | 10 | 15 | 10 |
| Monofunctional monomer | Methoxy polyethylene glycol (PEG600) methacrylate | 20 | 20 | 20 | 18 | 18 | 25 | 18 | 10 |
| | 2-hydroxyethyl acrylate | 25 | 10 | 10 | 25 | 25 | 25 | 20 | 10 |
| | Glycidyl methacrylate | 5 | 10 | 15 | 3 | 5 | 10 | 20 | 10 |
| | Total | 94 | 107 | 125 | 85 | 92 | 102 | 105 | 70 |
| Initiator | Darocur 1173 (2-hydroxy-2-methylpropiophenone) | 2.5 | 2.5 | 2.5 | 2.5 | 2.5 | 2.5 | 2.5 | 2.5 |
| Amount of multifunctional monomer | | 44 | 67 | 80 | 39 | 44 | 42 | 47 | 40 |
| Amount of monofunctional monomer | | 50 | 40 | 45 | 46 | 48 | 60 | 58 | 30 |
| Amount ratio of multifunctional/monofunctional monomer | | 0.88 | 1.68 | 1.78 | 0.85 | 0.92 | 0.70 | 0.81 | 1.33 |
| Amount of hydrophilic monofunctional monomer | | 45.0 | 30.0 | 30.0 | 43.0 | 43.0 | 50.0 | 38.0 | 20.0 |
| Amount ratio of hydrophilic monomer (%) | | 47.9 | 28.0 | 24.0 | 50.6 | 46.7 | 49.0 | 36.2 | 28.6 |

Example 1

A first half-portion (50 wt %) of the hard coating composition of Preparation Example 1 was spray-coated on an ABS (acrylonitrile-butadiene-styrene (ABS) substrate, and then the coated ABS substrate was UV-irradiated with a high-pressure mercury lamp with a light intensity of 100 millijoules per square centimeter (mJ/cm$^2$) for 5 seconds. A second half portion 50 wt % of the hard coating composition was then spray-coated on the substrate, and again the second coat was UV-irradiated for 20 seconds to form a cured hard coating film to provide a coated ABS substate in a form of a laminate. The thickness of the obtained laminate is shown in Table 2.

Examples 2 to 5

Laminates were obtained in the same manner as in Example 1, except that the hard coating compositions obtained in Preparation Examples 2 to 5 were used, instead of the hard coating composition obtained in Preparation Example 1, respectively. The thicknesses of the obtained laminates are shown in Table 2.

Comparative Examples 1 to 10

Laminates were obtained in the same manner as in Example 1, except that the hard coating compositions obtained in Preparation Examples 6 to 15 were used, instead of the hard coating composition obtained in Preparation Example 1, respectively. The thicknesses of the obtained laminates are shown in Table 2.

Evaluation Example 2: Water Contact Angle Measurement

Water drop angles of each of the laminates obtained in Examples 1 to 5 and Comparative Examples 1 to 10 were measured three times at room temperature (25° C.) using a sessile drop method in which 0.3 μl of water droplets was placed onto the surface of each laminate at room temperature (25° C.) to measure an angle between the water droplets and the surface. The results are shown in Table 2.

Evaluation Example 3: Pencil Hardness Measurement

The pencil hardness of each of the laminates obtained in Examples 1 to 5 and Comparative Examples 1 to 10 was measured according to the ISO 15184 method with a Mitsubishi UNI pencil under a 1-kg load. The results are shown in Tables 2A and 2B.

TABLE 2A

| | | Ex. 1 | Ex. 2 | Ex. 3 | Ex. 4 | Ex. 5 | Comp Ex. 1 | Comp Ex.2 |
|---|---|---|---|---|---|---|---|---|
| Water | 1$^{st}$ | 32.7 | 36.7 | 35.1 | 36.3 | 34.6 | 45.2 | 23.2 |
| contact | 2$^{nd}$ | 34.8 | 34.1 | 35.8 | 35.4 | 32.8 | 46.8 | 20.5 |
| angle | 3$^{rd}$ | 33.1 | 33.8 | 33 | 35.2 | 33 | 42.2 | 22.8 |
| | Avg. | 33.5 | 34.9 | 34.6 | 35.6 | 33.5 | 44.7 | 22.2 |

TABLE 2A-continued

| | | Ex. 1 | Ex. 2 | Ex. 3 | Ex. 4 | Ex. 5 | Comp Ex. 1 | Comp Ex.2 |
|---|---|---|---|---|---|---|---|---|
| Pencil hardness | 500 g load | 9H | 9H | 9H | 9H | 9H | 8H | 4H |
| | 1 kg load | 7H | 8H | 8H | 8H | 7H | 6H | 2H |
| Thickness | (μm) | 130~180 | 170~210 | 150~200 | 150~200 | 130~190 | 130~180 | 170~210 |

TABLE 2B

| | | Comp Ex. 3 | Comp Ex. 4 | Comp Ex. 5 | Comp Ex.6 | Comp Ex. 7 | Comp Ex. 8 | Comp Ex. 9 | Comp Ex. 10 |
|---|---|---|---|---|---|---|---|---|---|
| Water contact angle | 1st | 27.8 | 44.5 | 46.3 | 21.2 | 23.2 | 22.7 | 30.1 | 43.7 |
| | 2nd | 29.5 | 42.5 | 44.8 | 20.4 | 24.5 | 20.1 | 29.1 | 39.2 |
| | 3rd | 30.3 | 39.8 | 45.2 | 22.6 | 23.9 | 21.9 | 27.5 | 40.9 |
| | Avg. | 29.2 | 42.3 | 45.4 | 21.4 | 23.9 | 21.6 | 28.9 | 41.3 |
| Pencil hardness | 500 g load | 5H | 8H | 8H | 4H | 4H | 3H | 4H | 8H |
| | 1 kg load | 3H | 6H | 6H | 2H | 2H | 1H | 2H | 6H |
| Thickness | (μm) | 150~200 | 150~200 | 130~190 | 140~180 | 140~180 | 160~200 | 130~170 | 150~190 |

As shown in Tables 2A and 2B, it was confirmed that when hard coating films were formed using hard coating compositions in which the amount by weight of the multifunctional monomer was greater than the amount by weight of the monofunctional monomer, and the amount of the monofunctional monomer with the hydrophilic group was about 29 wt % to about 45 wt % based on the total weight of the composition, the obtained hard coating films had a water contact angle of 40° or less and a surface pencil hardness of 6H or greater at a 1 kilogram (kg) load.

In regard to Comparative Examples 2 and 6 to 8 in which the amount of the hydrophilic monofunctional monomer exceeded 45 wt %, hydrophilic hard coating films with a water contact angle of about 20° were obtained, however these comparative coatings each exhibited a significantly lower pencil hardness of 1H or 2H, and thus a desired hydrophilic hard coating film was not obtained. In Comparative Example 1, 4, 5, and 10 in which the amount of the hydrophilic monofunctional monomer was less than 29 wt %, a pencil hardness of 6H at a 1 kg load was obtained, however these comparative examples exhibited a water contact angle of greater than 40°, and thus a desired hydrophilic hard coating film was not obtained. In Comparative Example 9, in which the amount of the monofunctional monomer with the hydrophilic group was 29 wt % to 45 wt %, the comparative example exhibited a reduced hardness of 2H because the amount of the monofunctional monomer was greater than that of the multifunctional monomer.

As described above, according to the one or more embodiments, a hard coating composition according may form a hard coating film when coated on a substrate and cured by UV light, the hard coating film having a water contact angle of 40° or less and a surface pencil hardness at 1 kg load of 6H or greater, so that a hydrophobic contaminant present on a substrate, for example, an organic substance, may be more easily washed away or removed with water, and thus the amount of water used to clean the surface of the substrate may be reduced. In addition, the hard coating film may have a sufficient hardness to inhibit the formation of scratches or cracks when the surface of the substrate is washed with a washing tool. Moreover, the hard coating provides the substrate with excellent durability.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A laminate comprising:

a substrate; and a single hard coating film disposed on the substrate, the single hard coating film comprising a cured (meth) acrylate-based resin, wherein the single hard coating film has an average water contact angle of 33.5° to 40° and a pencil hardness of 6H or greater at a 1 kilogram load, wherein the cured (meth)acrylate-based resin comprises a mixture of multifunctional monomer units and two or more monofunctional monomer units with a hydrophilic group, wherein the mixture of the multifunctional monomer units includes monomer units derived from a tetra(meth) acrylate monomer, a tri(meth)acrylate monomer, and a di(meth)acrylate monomer, wherein a weight ratio of the tetra(meth)acrylate monomer, the tri(meth)acrylate monomer, and the di(meth) acrylate monomer is 0.2-1.8:2.8-4.8:1, wherein a weight ratio of the multifunctional monomer units to the two or more monofunctional monomer units with the hydrophilic group is 1:1 to 1.5:1, wherein the two or more monofunctional units with the hydrophilic group comprises a monomer unit derived from methoxy polyethylene glycol (meth)acrylate and hydroxyethyl (meth)acrylate, wherein the two or more monofunctional monomer units with the hydrophilic group in the cured (meth)acrylate-based resin is 29 weight percent to 45 weight percent, based on the total weight of monomer units of the single hard coating film.

2. The laminate of claim 1, wherein the single hard coating film has a thickness of about 100 micrometers to about 250 micrometers.

3. The laminate of claim 1, wherein the two or more monofunctional monomer units with the hydrophilic group comprises a glycidyl group-containing (meth)acrylate.

4. The laminate of claim 1 being free of metals.

5. The laminate of claim 1, wherein the mixture of the multifunctional monomer units comprise three or more of pentaerythritol tetra(meth)acrylate, pentaerythritol tri(meth) acrylate, pentaerythritol di(meth)acrylate, dipentaerythritol di(meth)acrylate, dipentaerythritol tri(meth)acrylate, dipentaerythritol tetra(meth)acrylate, dipentaerythritol penta(meth)acrylate, dipentaerythritol hexa(meth)acrylate, ethoxylated trimethylolpropane di(meth)acrylate, ethoxylated trimethylolpropane tri(meth)acrylate, ethoxylated ditrimethylolpropane di(meth)acrylate, ethoxylated ditrimethylolpropane tri(meth)acrylate, ethoxylated ditrimethylolpropane tetra(meth)acrylate, ethoxylated ditrimethylolpropane penta (meth)acrylate, ethoxylated ditrimethylolpropane hexa(meth)acrylate, glycerol tri(meth)acrylate, glycerol di(meth) acrylate, propoxylated glycerol di(meth)acrylate, propoxylated glycerol tri(meth)acrylate, ethylene glycol di(meth)acrylate, propylene glycol di(meth)acrylate, 1,3-butanediol di(meth)acrylate, 1,4-butanediol di(meth)acrylate, neopentyl glycol di(meth)acrylate, diethylene glycol di(meth)acrylate, triethylene glycol di(meth)acrylate, dipropylene glycol di(meth)acrylate, ethoxylated bisphenol A di(meth)acrylate, or ethoxylated bisphenol F di(meth)acrylate.

6. The laminate of claim 5, wherein the mixture of three or more multifunctional monomer units comprise pentaerythritol tetra(meth)acrylate, ethoxylated ditrimethylolpropane tetra(meth)acrylate, pentaerythritol tri(meth)acrylate, ethoxylated trimethylolpropane tri(meth)acrylate, ethoxylated ditrimethylolpropane tri(meth)acrylate, ethoxylated bisphenol A di(meth)acrylate, or ethoxylated trimethylolpropane di(meth)acrylate.

7. The laminate of claim 6, wherein the cured (meth) acrylate-based resin further comprises a monofunctional monomer unit without a hydrophilic group.

8. The laminate of claim 5, wherein the mixture of three or more multifunctional monomer units in the cured (meth) acrylate-based resin is 53 weight percent to 59 weight percent, based on the total weight of monomer units of the single hard coating film.

9. The laminate of claim 5, wherein the cured (meth) acrylate-based resin includes less than 1000 ppm of metal.

10. An article comprising the laminate according to claim 1.

11. A laminate comprising:

a substrate; and a single hard coating film disposed on the substrate, the single hard coating film comprising a cured (meth) acrylate-based resin, wherein the single hard coating film has an average water contact angle of 33.5° to 40° and a pencil hardness of 6H or greater at a 1 kilogram load, wherein the cured (meth)acrylate-based resin comprises a mixture of three or more multifunctional monomer units and a monofunctional monomer unit with a hydrophilic group, wherein the mixture of the three or more multifunctional monomer units includes monomer units derived from a tetra(meth)acrylate monomer, a tri(meth)acrylate monomer, and a di(meth)acrylate monomer, wherein the mixture of the three or more multifunctional monomer units comprise pentaerythritol tetra(meth) acrylate, ethoxylated ditrimethylolpropane tetra(meth) acrylate, pentaerythritol tri(meth)acrylate, ethoxylated trimethylolpropane tri(meth)acrylate, ethoxylated ditrimethylolpropane tri(meth)acrylate, ethoxylated bisphenol A di(meth)acrylate, or ethoxylated trimethylolpropane di(meth)acrylate, and the mixture of the three or more multifunctional monomer units comprises a weight ratio of the tetra(meth)acrylate monomer, the tri(meth)acrylate monomer, and the di(meth)acrylate monomer is 0.2-1.8:2.8-4.8:1, wherein a weight ratio of the three or more multifunctional monomer units to the monofunctional monomer unit with the hydrophilic group is 1:1 to 1.5:1, wherein the monofunctional unit with the hydrophilic group comprises a monomer unit derived from methoxy polyethylene glycol (meth)acrylate, wherein the monomer unit derived from the monofunctional monomer unit with the hydrophilic group in the cured (meth)acrylate-based resin is 29 weight percent to 45 weight percent, based on the total weight of monomer units of the single hard coating film, and the mixture of the three or more multifunctional monomer units in the cured (meth)acrylate-based resin is 53 weight percent to 59 weight percent, based on the total weight of monomer units of the single hard coating film.

* * * * *